3,329,013
TENSION MEASURING DEVICE
Lucien J. Beindorf, Walter E. Huber, and Hugh D. Terhune, Springfield, Mo., assignors to Dayco Corporation, Dayton, Ohio, a corporation of Ohio
Filed Sept. 11, 1963, Ser. No. 308,198
1 Claim. (Cl. 73—144)

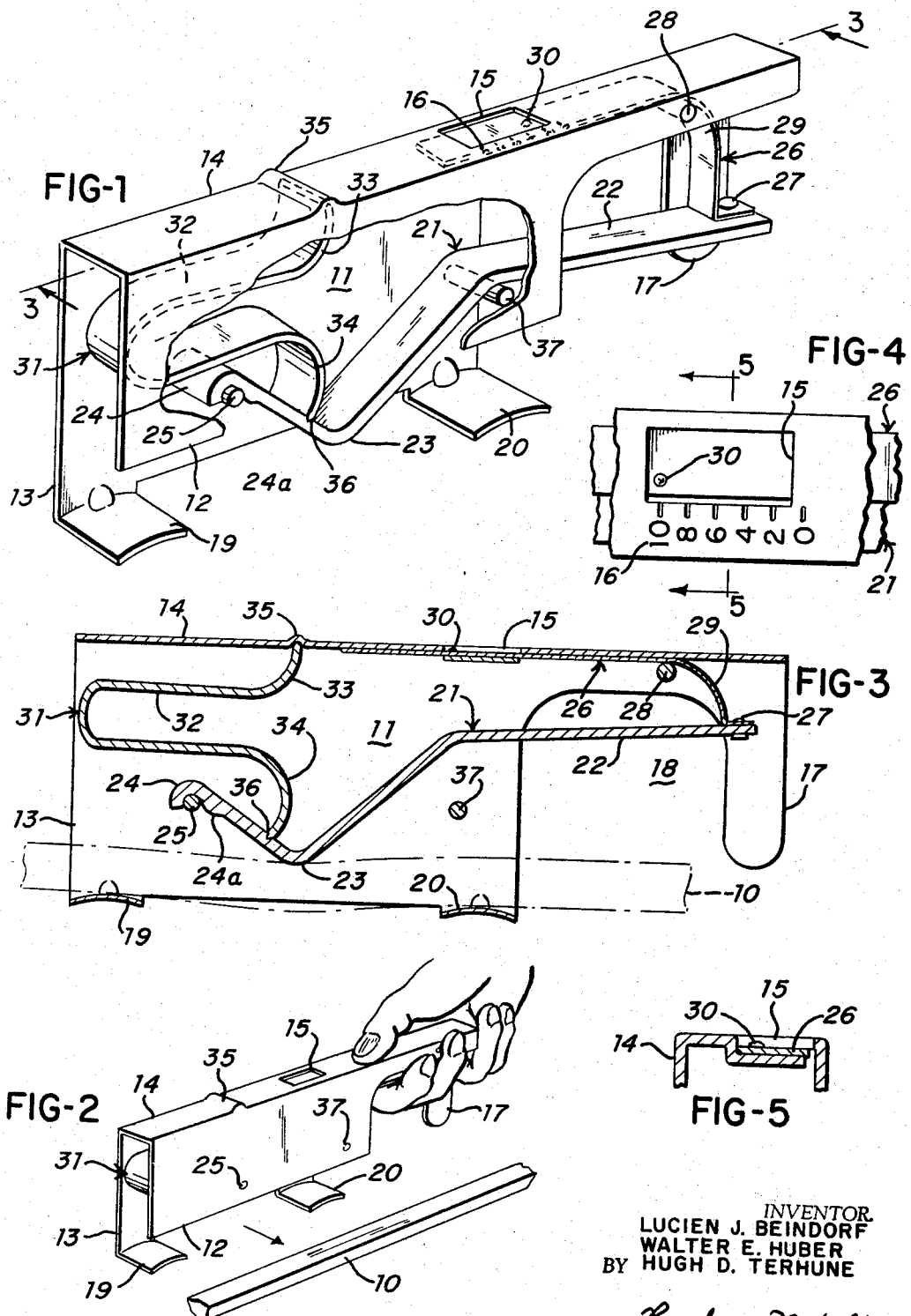
July 4, 1967 L. J. BEINDORF ET AL 3,329,013
TENSION MEASURING DEVICE
Filed Sept. 11, 1963
INVENTOR.
LUCIEN J. BEINDORF
WALTER E. HUBER
BY HUGH D. TERHUNE
ATTORNEY United States Patent Office 3,329,013
Patented July 4, 1967

This invention relates to a tension measuring device and more particularly to a device which will visually indicate the tension of an elongated member such as a transmission belt, more commonly referred to as a V-belt.

V-belts have long been used for transmission of power in the industrial field and in the automotive industry. In automobiles and trucks in particular the V-belt has found widespread use, and the maintenance and care of such V-belts have become an important problem. In this connection there has long been a need for a portable and inexpensive device for measuring the tension of the V-belt, and particularly a device which is portable, can be easily applied to the belt by a mechanic, and permits the tension in the belt to be read in a simple manner. It is further desirable to design this device in such a manner that the mechanic can then adjust the belt to the proper tension while the device is still mounted in place on the belt.

Other devices attempting to solve this problem have been placed on the market, but have been found unsatisfactory because they are too expensive, too complex, do not permit adjustment of the belt while the device is in place, or are not sufficiently versatile in construction to permit a wide range of belts to be measured. Certain of these devices have also been found to be too large to use in the modern automobile because of the limited space available for inserting the device upon the belt. It is obvious that if a mechanic were forced to remove the various accessories in the engine compartment, the advantages of using such a device would be lost.

It is, therefore, a primary object of this invention to provide a device for measuring the tension of a V-belt.

It is a further object to provide such a device which is easily applied to the belt.

It is still another object to provide such a device which may be left in place without holding while the belt is adjusted for proper tension.

It is still another object to provide a device which provides clear and accurate readings indicating the tension of the belt.

It is still another object to provide a device which is simple in construction and requires no maintenance.

It is a further object to provide a device which has parts that may be readily removed and replaced in order to extend the versatility of the device when measuring belts of different sections and operating tensions.

In order to carry out the above objects and to overcome the objections of prior art devices, applicants have devised a device or gauge which is exceedingly simple in construction, is fabricated from a minimum of parts, and is easily portable yet capable of withstanding rough service. At the same time, it is a simple matter to slip this device upon the belt to be measured and obtain an accurate reading of the belt tension, and subsequently regulate the belt tension while the gauge is still in place. A series of interchangeable springs and arms may be quickly exchanged in order to extend the use of the device when a wide range of belt tensions is involved or when belts have dissimilar characteristics of thickness and shapes. The device consists essentially of a body having front and back surfaces and a pair of supports which extend from the back surface toward the front in order to engage the inner surface of the belt. Mounted on the body is an arm which contacts the outer surface of the belt and which tends to be deflected by the belt and has attached thereto a flexible strip which is caused to slide along the upper surface of the body to indicate the amount of tension. A spring member applies the necessary tension to the arm by applying inward force against the outer surface of the belt; that is, a force toward the plane of the supports; in order to maintain the proper relationship and give the required readings. By replacing the arm it is possible to accommodate belts having different thicknesses, and by replacing the spring it is possible to provide accurate readings for belts in different tension ranges.

Additional objects of the invention will be apparent from the following specification and drawings, in which:

FIGURE 1 is a perspective view of the novel device in relaxed position.

FIGURE 2 is a perspective view of the device as it is about to be mounted upon a belt.

FIGURE 3 is a sectional view of the device taken along lines 3—3 of FIGURE 1, illustrating the operation of the device.

FIGURE 4 is a top elevational view of a portion of the device illustrating the measuring scale.

FIGURE 5 is a sectional view, taken along lines 5—5 of FIGURE 4.

Turning now to the drawings, the tensioning device is shown in FIGURES 2 and 3 with relationship to a belt 10 which is to be measured. As appearing in these figures, the upper surface of the belt is actually the outer surface of the belt as it travels about the pulleys in normal operation. The device primarily consists of a body 11 which is made either of a conventional metal material such as steel, or a high impact plastic material such as polystyrene. The body comprises parallel front and back sides 12 and 13, the back side extending somewhat below the front side. These sides are interconnected by the top surface 14 but are not interconnected on the lower surface, thus leaving the lower portion of the body open. Located on the top surface is an aperture 15 and adjacent this aperture are a series of markings 16 which are indicative of belt tension. The back side 13 also comprises a leg 17 which extends downwardly and defines an opening 18 between this leg and the main portion of this member. Extending at right angles from the lower extremity of the back side 13 toward the front side 12 are two parallel supports 19 and 20 which are slightly curved to provide convex upper surfaces.

Mounted within the body is an arm 21 formed of steel to provide a fairly rigid member. One end of this arm forms a horizontal section 22 which then angles downwardly to form a lower segment 23, subsequently extending upwardly and terminating in a curved end 24. The lower segment 23 is, therefore, roughly U-shaped in appearance. The end 24 is hooked about a pin 25 which is mounted between the front and back sides 12 and 13, and the end 24 further has a thickened section 24a which serves as a locking device around the pin 25. At the extremity of the horizontal section 22 is mounted a flexible strip 26, preferably of thin spring steel; this is mounted to the horizontal section by means of a rivet 27 or other convenient mounting means. The strip 26 passes over another pin 28 which is also mounted between the front and back sides, and is formed into an arc 29 between the point of mounting and the pin. The remainder of the strip is approximately horizontal and parallel to the top surface 14 and contains a dimple or other marking 30 which is visible within the aperture 15. Mounted between the front and back sides is still another pin 37, located below the section 22 of the arm 21, serving as a downward limiting stop to the arm 21.

Mounted within the body is a spring 31 which consists essentially of a U-shaped section 32, and upper leg 33, and a lower leg 34. This spring is formed of a comparatively thin strip of spring steel formed into the shape illustrated. The upper leg 33 is mounted in an indent 35 in the top surface 14, while the lower leg 34 is mounted in an indent 36 which is located in the arm 21 almost adjacent the curved end 24. This spring is held in place by means of the spring pressure forcing the legs into the indents but is free for removal by squeezing together the U-shaped section 32 which releases this outward pressure.

Operation of the device

When it is desired to check the tension of the belt the operator will grasp the device as shown in FIGURE 2 so that he is squeezing the horizontal section 22 of the arm 21 toward the top surface 14. This then causes the lower segment 23 to be pulled upward as far as possible and permits the operator to slide the supports 19 and 20 under the belt so that the inner surface of the belt rests upon these supports. He then releases the squeezing force upon the section 22 and the force of the spring 31 tends to force the lower segment 23 inward (downward in the drawings) until it rests against the outer surface of the belt. It is thus clear that the position of the segment 23 and hence the remainder of the arm 21 will be affected by the tension within the belt; a slack belt will permit the lower segment 23 to be compressed farther, while a tight belt will force it upward. The position of the arm will be translated through the strip 26 which will tend to slide over the pin 28 and reach a stabilized position. By viewing the dimple 30 through the aperture 15 it is possible to read a value as indicated by the markings 16. At the same time, the gauge remains in this position and is tightly held by the pressure of the spring 31 so that it can be left without holding while the operator adjusts the tension of the belt. As the operator changes the belt tension the segment 23 will be moved up or down according to the desired tension, thus causing the arm 21 to oscillate about the pin 25 as a pivot. This in turn causes strip 26 to move until the dimple 30 reads opposite the desired marking. These markings have been previously calibrated for certain classes of belts in order to provide the proper range of tensions.

When the operator wishes to remove the device from the belt it is only necessary for him to pull it directly off. The arm 21 will return to a relaxed position and the pin 37 will act to prevent the arm from passing too far downward and falling out of the assembly. Another highly important feature of the invention involves the ability to change certain portions of the device according to variations in the belt to be tested, if, for example, the tension of the particular belt is too high or too low to permit a proper reading. In this case it is only necesary to replace the spring 31 with another spring having different characteristics. This can be done very simply by grasping the sides of the U-shaped section 32 with the finger and thumb and squeezing it together to permit the legs 33 and 34 to be pulled out of the indents 35 and 36. The spring is pulled directly out of the assembly and another one is substituted. By use of the proper spring not only various ranges of belt tensions may be checked but also other belt characteristics such as may be found in special installations for the drives.

If it is found that the belt to be tested is too thick or too thin to give a proper reading, the arm 21 may also be replaced. This is done by again removing the spring 31 as before which then relieves the pressure upon the arm and permits the arm to be pulled out by unhooking the curved end 24 from the pin 25 and pulling the strip 26 away from the pin 28. The entire arm and strip assembly are then pulled straight down from the body and a different one substituted. If the belt has a thinner section it will be necessary to insert an arm in which the lower segment 23 extends farther downward; that is, toward the plane of supports 19 and 20. If it is desired to measure a thicker belt the arm 21 will have a lower portion 23 that does not extend as far toward the plane of supports 19 and 20. It should be noted that in no instance is the strip 26 changed since its primary function is to act as an indicator opposite the scale 16. In fact, any replacement strip should have the same characteristics of flexibility to maintain proper readings.

It can thus be seen that by means of this invention a tension measuring device is provided whereby belt tensions may be easily measured. In addition, the device is sufficiently versatile so that by substitution of certain parts, various sizes and other classifications of belts may be measured with extreme accuracy.

While the invention has been described with reference to a specific embodiment, it should be noted that other modifications may be made without departing from the spirit of the invention.

We claim:

A device for measuring belt tension comprising a body having an upper surface with an aperture therein and having markings adjacent said aperture, a back side having spaced coplanar supports engaging the inner surface of said belt; a deflection arm engaging the outer surface of said belt, said arm having one end mounted on said body above said supports and its other end free of movement relative to the plane of said belt; a flexible member secured to the free end of said arm and capable of movement relative to the upper surface of said body so that movement of said arm and member is indicated in said aperture; and a spring mounted between the upper surface of said body and said arm and urging said arm inwardly against the outer surface of said belt.

References Cited

UNITED STATES PATENTS

| 1,647,287 | 11/1927 | Floyd | 73—144 |
| 2,085,883 | 7/1937 | Weeks | 73—144 |
| 2,196,099 | 4/1940 | Calame | 73—144 |
| 2,996,914 | 8/1961 | Delehanty | 73—144 |

FOREIGN PATENTS

| 755,633 | 9/1933 | France. |

JAMES J. GILL, *Primary Examiner.*

C. A. RUEHL, *Examiner.*